Patented Aug. 19, 1952

2,607,678

UNITED STATES PATENT OFFICE 2,607,678

METHOD OF DEINKING WASTE PAPER

Louis J. Scheid, Watervliet, Mich., assignor to Watervliet Paper Company, Watervliet, Mich., a corporation of Michigan No Drawing. Application August 5, 1947, Serial No. 766,463

5 Claims. (Cl. 92—1.5)

This invention relates to improvements in method of de-inking waste paper.

The main objects of the invention are:

First, to provide an improved method for removing from waste paper inks of the type which are made of materials that are dissolved in a volatile solvent, that on evaporating leaves a hard ink film on the surface of the paper, such as inks of the type having as a base, gilsonite asphalt.

Second, to provide an improved method for removing inks of the type above described and which in the same operations is also adapted to remove inks of the type having as a base, a drying or oxidizing oil, such as linseed oil.

Objects relating to details and economies will appear from the description to follow. The invention is pointed out and defined in the claims.

Printing inks of the type having as a base, a drying or oxidizing oil such as linseed oil are quite readily removed by cooking the paper in a hot alkaline solution. This saponifies the oil and allows the oils and pigments of the ink to separate from the paper. These can be rinsed out in a washing process very similar to the rinsing of soap from clothing.

Printing inks made from materials that are dissolved in a volatile oil which on evaporating leave a hard ink surface on the paper are usually not saponifiable nor soluble in an alkali. One of the commoner types of these non-saponifiable inks is known as rotogravure ink, the base of which is gilsonite asphalt. It is impossible to remove an ink of this type by conventional methods. Such inks are, however, soluble in hot oils such as gasoline, kerosene, or other petroleum distillates.

In one embodiment of my improved method both of the above described types of ink may be removed from waste paper in the same system and at one time. The steps for so removing both types of ink are as follows:

An alkaline solution of 400 pounds of caustic soda and 130,000 pounds of water is prepared in the same manner as is common in the ordinary de-inking procedure of inks of the type having as a base a drying or oxidizing oil, such as linseed oil. To this is added 15,000 pounds of waste magazines printed with both types of inks, the oil soluble type of ink such as that of gilsonite asphalt base being substantially in excess of the drying or oxidizing type of ink. After partially de-fibering the magazines and at the same time heating them to approximately 190° F., 800 pounds of a petroleum distillate is added to the mixture.

The petroleum distillate oil suspended in the water very readily dissolves the oil-soluble inks, most of which are of a gilsonite asphalt base. These inks are completely removed from the paper and remain suspended as an oily mass in the water, but not in such manner that this oily mass can be readily separated from the fibers of the paper. To permit this separation to be readily effected by a conventional washing method, 200 pounds of solubilized soy flour is added and the whole mass is agitated until all of the oily mass is emulsified. The emulsified oil being readily suspended as particles in the water and not floating around as oil globules can be rinsed from the pulp by conventional methods.

The relative amount of petroleum distillate used to dissolve the oil soluble inks will vary, depending on the consistency at which the pulping operation is effected, that is, depending upon the ratio in pounds of the waste paper to the alkaline solution. This ratio or consistency in the above described pulping operation is approximately 11½ percent. The relative amount of distillate may also vary to some extent, depending upon the relative amounts and character of inks on the waste paper. It is possible to reduce the relative total amount of ink-dissolving oil used to approximately one-half that above described and get de-inking results. For instance, with the above described quantity of alkaline solution remaining constant it is possible to reduce the quantity of ink-dissolving oil or distillate from 800 pounds to approximately 400 pounds.

Soy flour, previously described as an emulsifying agent, is used because it makes very stable emulsions that stand high temperatures without the oil and water separating and also because it is inexpensive. However, there are many other emulsifying agents that could be used, it only being necessary to select one that will give a sufficiently stable emulsion so that the oil does not separate from the water and float around in the stock, because when the emulsion breaks up an oily film is deposited in the paper, producing an appearance of specks of dirt. Protein is the active constituent of the soy flour in emulsifying the oily mass. Casein, and protein isolated from soy flour and isolated from other vegetable products can also be used as emulsifying agents.

Petroleum solvents such as gasoline, kerosene and distillate are previously described as solvents in de-inking soluble inks such as rotogravure ink having a base of gilsonite asphalt. However, it is possible to dissolve such inks with other solvents, such as carbon tetrachloride. Carbon tetrachloride dissolves the soluble type of inks at room temperature, for example at 70°, and it is not necessary to heat the suspension. This material can be used in conjunction with the petroleum type of solvents, permitting adjustment of the de-inking temperature. As little as one-half percent of tetrachloride added to the petroleum solvent reduces the temperature at which it is necessary to carry out the de-inking operation to that of room temperature. This is important in de-inking magazines containing ground wood pulp as they discolor badly at high temperatures. However, in de-inking waste paper printed with both of the above described types of inks the temperature will be determined by that necessary to saponify inks of the type having as a base a drying or oxidizing oil.

Inks having an oil soluble base such as gilsonite asphalt are previously described as removable by my process. Inks of resinous bases other than gilsonite asphalt, such as are soluble in hydrocarbons, carbon tetrachloride and similar solvents, may also be removed. The process is also adapted for the removal of wax, paraffin and asphalt from water proof papers and for the removal of other substances from waste paper, such as are soluble in hydrocarbons, carbon tetrachloride or similar solvents.

I have disclosed my invention in embodiments or adaptations thereof which I have found highly efficient. I have not attempted to disclose other embodiments or adaptations thereof as it is believed this disclosure will enable those skilled in the art to embody or adapt the invention as may be desired.

Having thus described my invention, what I claim as new and desire to secure by Letters Patent, is:

1. The process of removing inks from waste papers, said inks being of the type having an oil soluble base and of the type having a saponifiable oil base, comprising the steps of preparing an alkaline solution of caustic soda and water in the approximate ratio of 2 pounds of caustic soda to 650 pounds of water, adding waste paper to be de-inked to the alkaline solution in the approximate ratio of 75 pounds paper to 652 pounds of alkaline solution, after partially defibering the paper and simultaneously heating the mixture to a temperature of approximately 190° F. to saponify the type of ink having a saponifiable oil base, adding an organic solvent to the mixture in the approximate ratio of 4 pounds of said organic solvent to 727 pounds of mixture to dissolve the ink of the type having an oil soluble base, said organic solvent being selected from the group consisting of kerosene, gasoline and carbon tetrachloride, adding soy flour to the mixture in the approximate ratio of 1 pound of soy flour to the 731 pounds of mixture to emulsify the oily mass, agitating the mixture until the oily mass is emulsified, and thereafter washing the paper pulp to remove the saponified ink of the type having a saponifiable oil base and to remove the emulsified oily mass.

2. In the process of removing inks from waste paper, said inks being of the type having an oil soluble base and of the type having a saponifiable oil base, the steps of adding waste paper to be de-inked to an alkaline solution of caustic soda and water, and simultaneously heating the mixture to a temperature of approximately 190° F. to saponify the type of ink having a saponifiable oil base, adding an organic solvent to the mixture to dissolve the ink of the type having an oil soluble base, said organic solvent being selected from the group consisting of kerosene, gasoline and carbon tetrachloride, adding soy flour to the mixture to emulsify the oily mass, agitating the mixture until the oily mass is emulsified, and thereafter washing the paper pulp to remove the saponified ink of a saponifiable oil base and to remove the emulsified oily mass.

3. In the process of removing inks from waste paper, said inks being of the type having an oil soluble base and of the type having a saponifiable oil base, the steps of adding waste paper to be de-inked to an alkaline solution, adding an organic solvent to the mixture to dissolve the ink of the type having an oil soluble base, said organic solvent being selected from the group consisting of kerosene, gasoline, and carbon tetrachloride, adding soybean flour as an emulsifying agent to the mixture to emulsify the oily mass, agitating the mixture until the oily mass is emulsified, and washing the paper pulp to remove the saponified ink of an oxidizing oil base and to remove the emulsified oily mass.

4. In the process of de-inking waste paper, the steps of adding an organic solvent to a waste paper mixture to dissolve inks of an oil-soluble base, said organic solvent being selected from the group consisting of kerosene, gasoline, and carbon tetrachloride, adding soy flour as an emulsifying agent to emulsify the oily mass, agitating the mixture until the oily mass is emulsified, and washing the paper pulp to remove the emulsified oily mass.

5. In the process of removing oil soluble substances from waste paper the steps of agitating a mixture including waste paper pulp, carbon tetrachloride to dissolve the oil soluble substances from the paper, and soy flour as an emulsifying agent to emulsify the oily mass, continuing the agitation until the oily mass is emulsified, and then washing the mixture to remove the emulsified oily mass from the paper.

LOUIS J. SCHEID.

REFERENCES CITED

The following references are of record in the file of this patent:

UNITED STATES PATENTS

| Number | Name | Date |
|---|---|---|
| 1,572,479 | Hammond | Feb. 9, 1926 |
| 1,585,092 | Granton | May 18, 1926 |
| 1,707,604 | Fisher | Apr. 2, 1929 |
| 1,847,311 | Schur et al. | Mar. 1, 1933 |
| 1,986,907 | Wells | Jan. 8, 1935 |
| 1,990,376 | Hass | Feb. 5, 1935 |
| 1,993,362 | Crisp | Mar. 5, 1935 |
| 2,112,562 | Fisher | Mar. 29, 1938 |
| 2,144,756 | Fritz | Jan. 24, 1939 |
| 2,186,609 | Kress | Jan. 9, 1940 |
| 2,196,469 | Moeller et al. | Apr. 9, 1940 |
| 2,197,822 | Wood | Apr. 23, 1940 |

OTHER REFERENCES

Printing Inks by Ellis, published by Reinhold Publishing Corp., New York (1940), pages 480 to to 483.

De-inking of Paper by West, published by Institute of Paper Chemistry, Appleton, Wisc. (1943), pages 5 to 9, 14, and 15.